(No Model.)

W. Z. BROWN.
TRUCK.

No. 267,669. Patented Nov. 21, 1882.

Witnesses
Frank A Remley
William Ermentraut

Inventor
William Z. Brown
By L. P. Graham
atty.

UNITED STATES PATENT OFFICE.

WILLIAM Z. BROWN, OF DECATUR, ILLINOIS, ASSIGNOR OF ONE-HALF TO ELMER R. CULVER, OF SAME PLACE.

TRUCK.

SPECIFICATION forming part of Letters Patent No. 267,669, dated November 21, 1882.

Application filed June 15, 1882. (No model.)

*To all whom it may concern:*

Be it known that I, WILLIAM Z. BROWN, of Decatur, in the county of Macon and State of Illinois, have invented certain new and useful Improvements in Hand-Trucks, of which the following is a specification.

My invention consists in the construction and arrangement of the wheels with relation to the body of the truck, by means of which said wheels may be used in one definite position at the front of the truck, while a portion of the load is supported by the operator, and may also be swung back to another definite position near the longitudinal center of the truck-body and made to support the whole of the balanced load.

My invention further consists in a pair of secondary attachable wheels provided with suitable axle and tongue, which, when attached to my truck in my peculiar manner, transforms the same into a four-wheeled wagon or truck.

My invention also consists in a pair of detachable skids that I use to load or unload heavy articles directly on or off a dray or other elevation.

Figure 1:
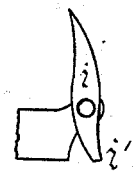
Figure 2:
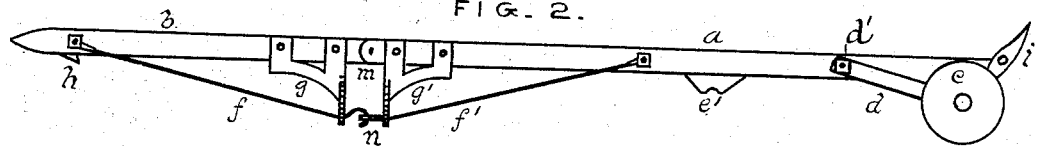
Figure 3:
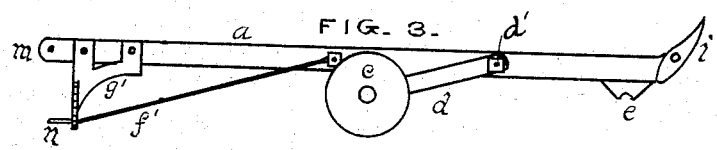
Figure 4:
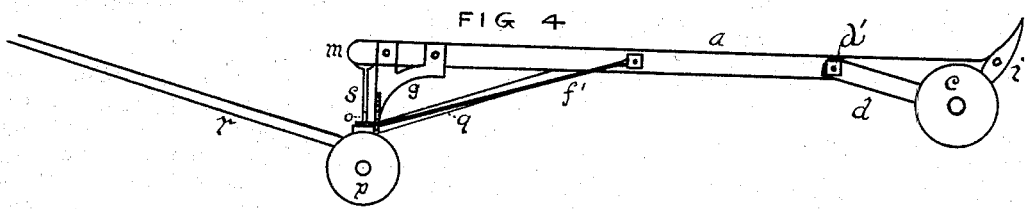
Figure 5:
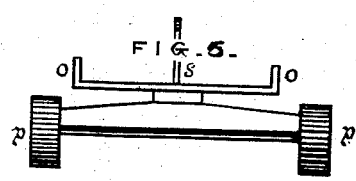

In the drawings accompanying and forming a part of this specification, Figure 1 is a side view of a section of the front end of my truck, showing a pivoting-point which may be used effectively with my invention, but which I lay no claim to. Fig. 2 is a side elevation of my truck and skid attachment. Fig. 3 is a side elevation of the truck. Fig. 4 is the truck converted into a wagon. Fig. 5 is an end view of the extra set of wheels.

$a$ is the truck; $b$, the skid attachment; $c$, the wheels that pivot on bar $d$. $e$ $e'$ are supports for the axle. $f f$ are braces from plates $g$ $g'$. $h$ is a point or hook that secures the skids to the dray or other elevation. $m$ is the joint between the truck and skids, secured by hooks in rings $n$. $o$ $o$ are upward projections from the axle in wheels $p$ $p$. These projections fit into rings $n$, while support $s$ and brace $q$ are attached to rounds of the truck. $r$ is a tongue attached as shown.

The wheels $c$ $c$ are ordinarily used at the front end of the trucks, and their axle works in the blocks $e$. When a large heavy load is to be moved the wheels are swung upon their supporting-levers $d$, around their center $d'$, and brought back under the center of the truck, while the axle rests in blocks $e'$. In this position the operator does not take hold of the truck-handles, but balances the load on the centrally-located wheels, and by pushing against said load handles it with ease.

The operation of the attached skids is readily understood. The braces $f f'$ and brackets $g$ $g'$ tend always to hold the skids rigid with the truck when they are united. The secondary attachable wheels, $p$, are secured to the ends of the truck-beams $a$ by means of the king-bolt $s$ and braces $q$. Further security is afforded by the upward projections $o$ entering the rings $n$.

I claim—

1. In a truck, the combination, with the frame $a$, of the attached skids $b$, pivoted to the frame at $m$, the brackets $g$ $g'$, one placed on the frame $a$ and the other on the skids $b$, and the braces $f$ $f'$, attached respectively to the skids and the frame, and extended down and united under the brackets $g$ $g'$, substantially as and for the purpose set forth.

2. The secondary detachable wheels, $p$, mounted on an axle provided with king-bolt $s$, which is connected with the frame $a$, and with the upward projections $o$ $o$, which enter rings $n$ at the junction of the braces $f f'$, all combined together, as shown, and with the frame $a$, wheels $c$, and braces $f f'$, as set forth.

3. In a truck, the combination of wheels $c$, swinging levers $d$, and truck-frame $a$, as and for the purpose set forth.

WILLIAM Z. BROWN.

Attest:
ISAAC D. WALKER,
L. P. GRAHAM.